United States Patent
Kim et al.

(10) Patent No.: US 12,418,438 B2
(45) Date of Patent: Sep. 16, 2025

(54) METHOD FOR TRANSMITTING MESSAGE AT HIGH RATE BY VEHICLE

(71) Applicant: LG ELECTRONICS INC., Seoul (KR)

(72) Inventors: Cheolseung Kim, Seoul (KR); Youngjin Han, Seoul (KR); Jaejin Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 229 days.

(21) Appl. No.: 18/031,315

(22) PCT Filed: Oct. 14, 2020

(86) PCT No.: PCT/KR2020/014003
§ 371 (c)(1),
(2) Date: Apr. 11, 2023

(87) PCT Pub. No.: WO2022/080520
PCT Pub. Date: Apr. 21, 2022

(65) Prior Publication Data
US 2023/0379186 A1    Nov. 23, 2023

(51) Int. Cl.
*H04L 12/40*    (2006.01)

(52) U.S. Cl.
CPC ............ *H04L 12/40006* (2013.01); *H04L 2012/40215* (2013.01); *H04L 2012/40273* (2013.01)

(58) Field of Classification Search
CPC ..... H04L 12/40006; H04L 2012/40215; H04L 2012/40273
See application file for complete search history.

(56) References Cited

U.S. PATENT DOCUMENTS

2018/0227145 A1* 8/2018 Brochi ............... H04L 63/0428

FOREIGN PATENT DOCUMENTS

| KR | 10-2011-0035247 | 4/2011 |
|----|-----------------|--------|
| KR | 10-2012-0014554 | 2/2012 |
| KR | 10-2014-0012887 | 2/2014 |
| KR | 10-2014-0124255 | 10/2014 |
| KR | 10-2020-0057370 | 5/2020 |

OTHER PUBLICATIONS

PCT International Application No. PCT/KR2020/014003, International Search Report dated Jul. 14, 2021, 5 pages.

* cited by examiner

*Primary Examiner* — Rodney A Butler
(74) *Attorney, Agent, or Firm* — LEE, HONG, DEGERMAN, KANG & WAIMEY

(57) ABSTRACT

A method for transmitting a controller area network (CAN) message by a first analysis module included in a controller of a vehicle, including measuring a communication state of a CAN bus of the vehicle; generating a forward list including information for forwarding the CAN message based on the measured value exceeding a first predetermined value; transferring the forward list to a first forwarding module; and forwarding the CAN message on the basis of the forward list.

14 Claims, 11 Drawing Sheets

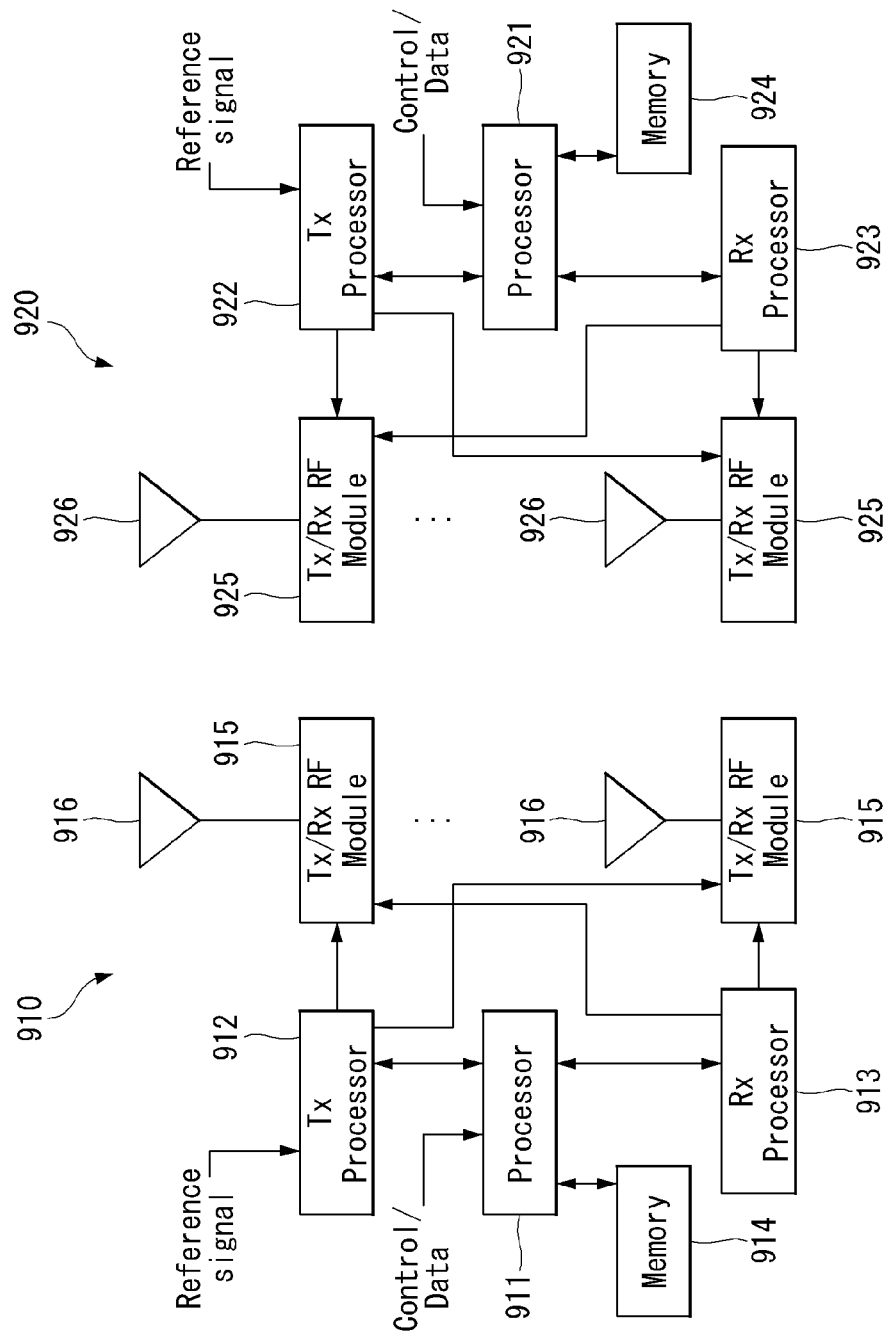
[FIG. 1]

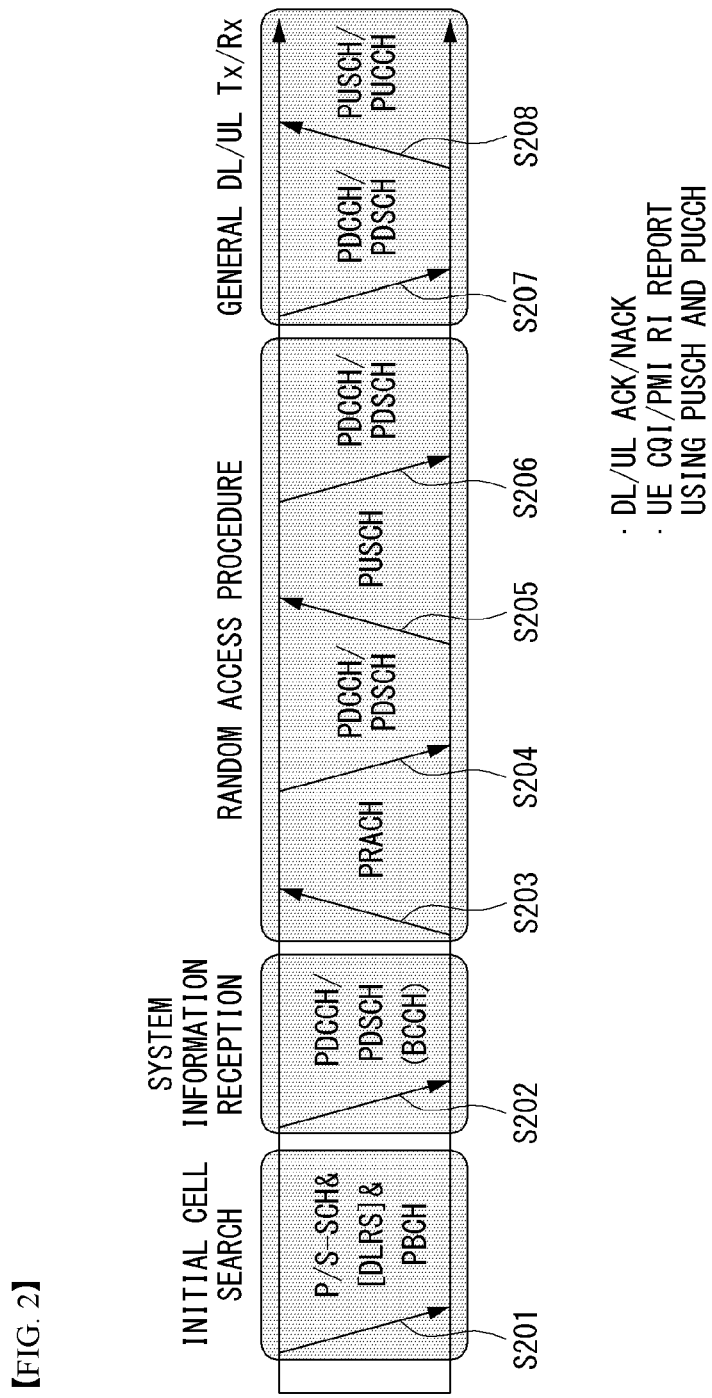
[FIG. 2]

[FIG. 3]
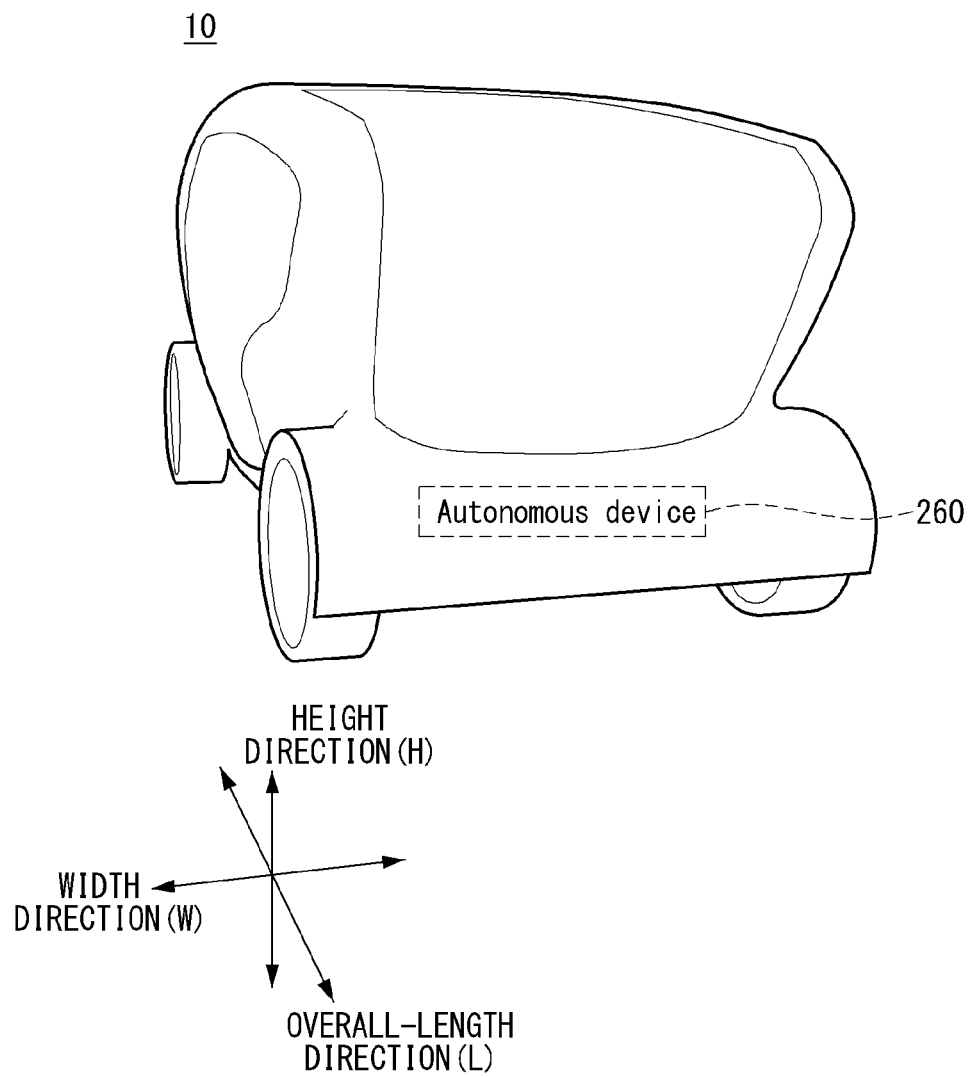

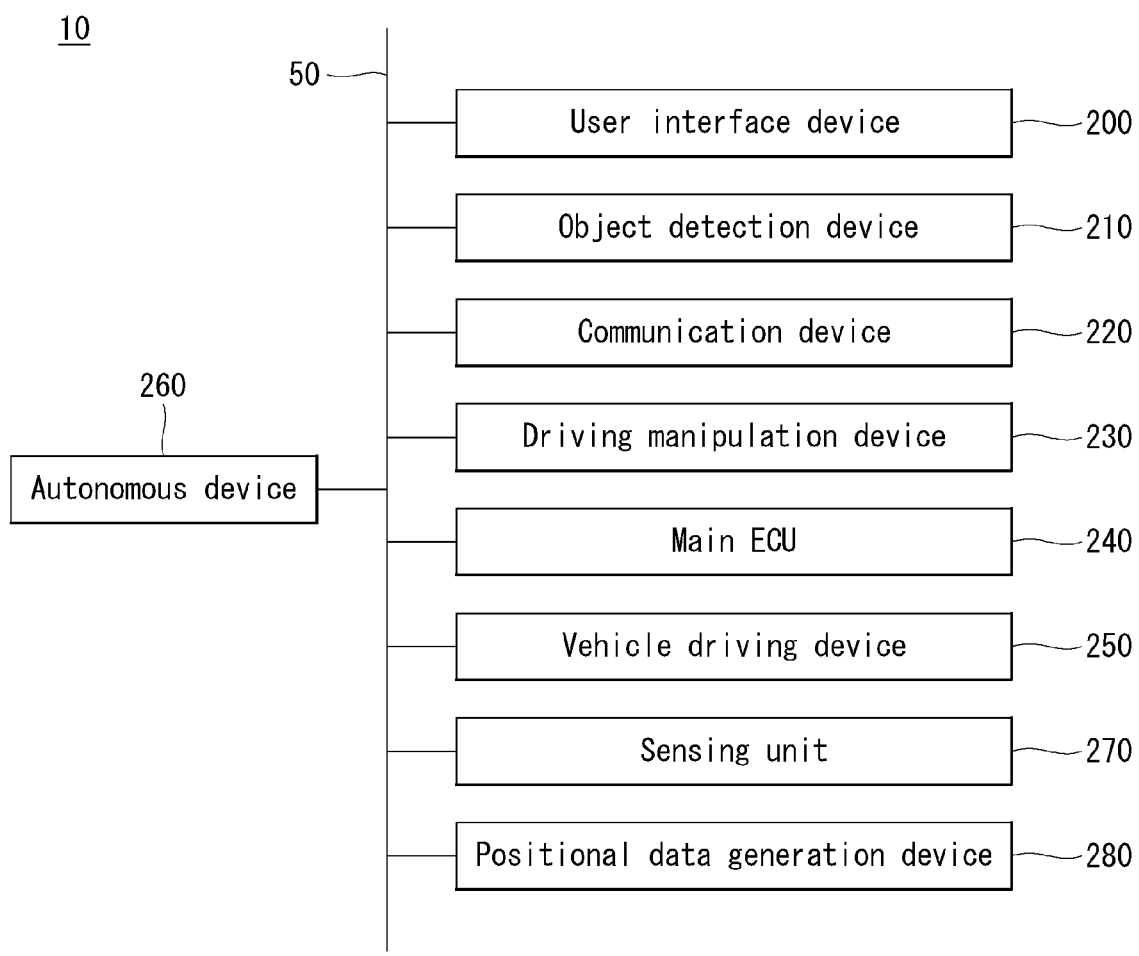

[FIG. 5]
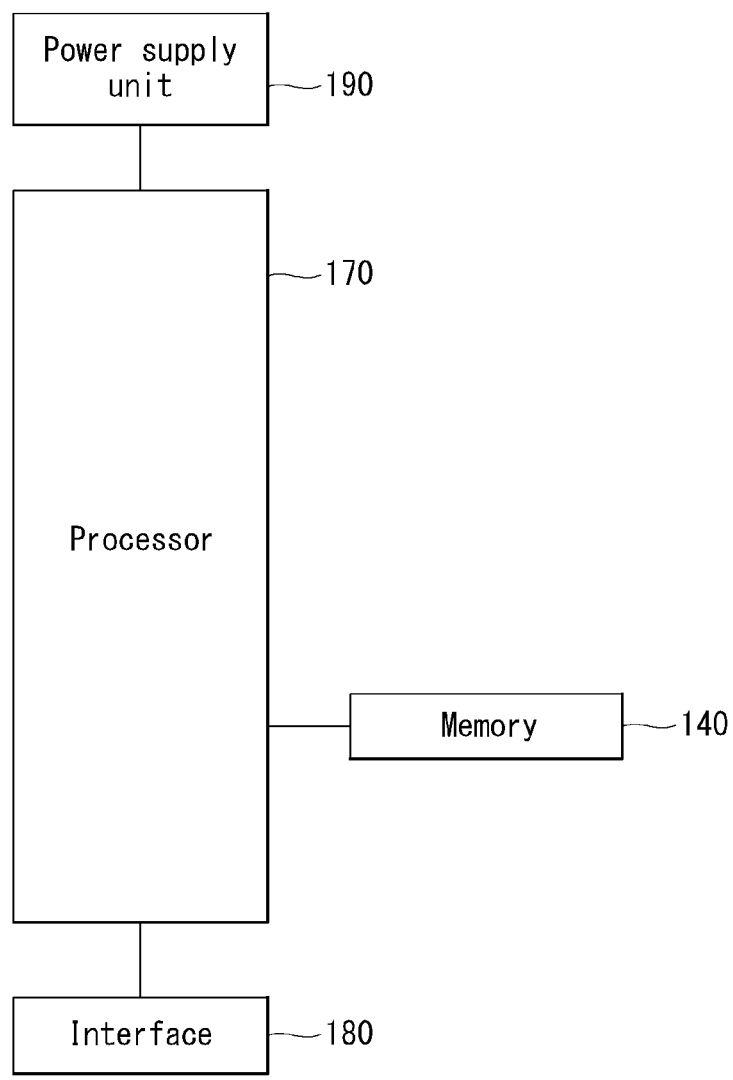

[FIG. 6]
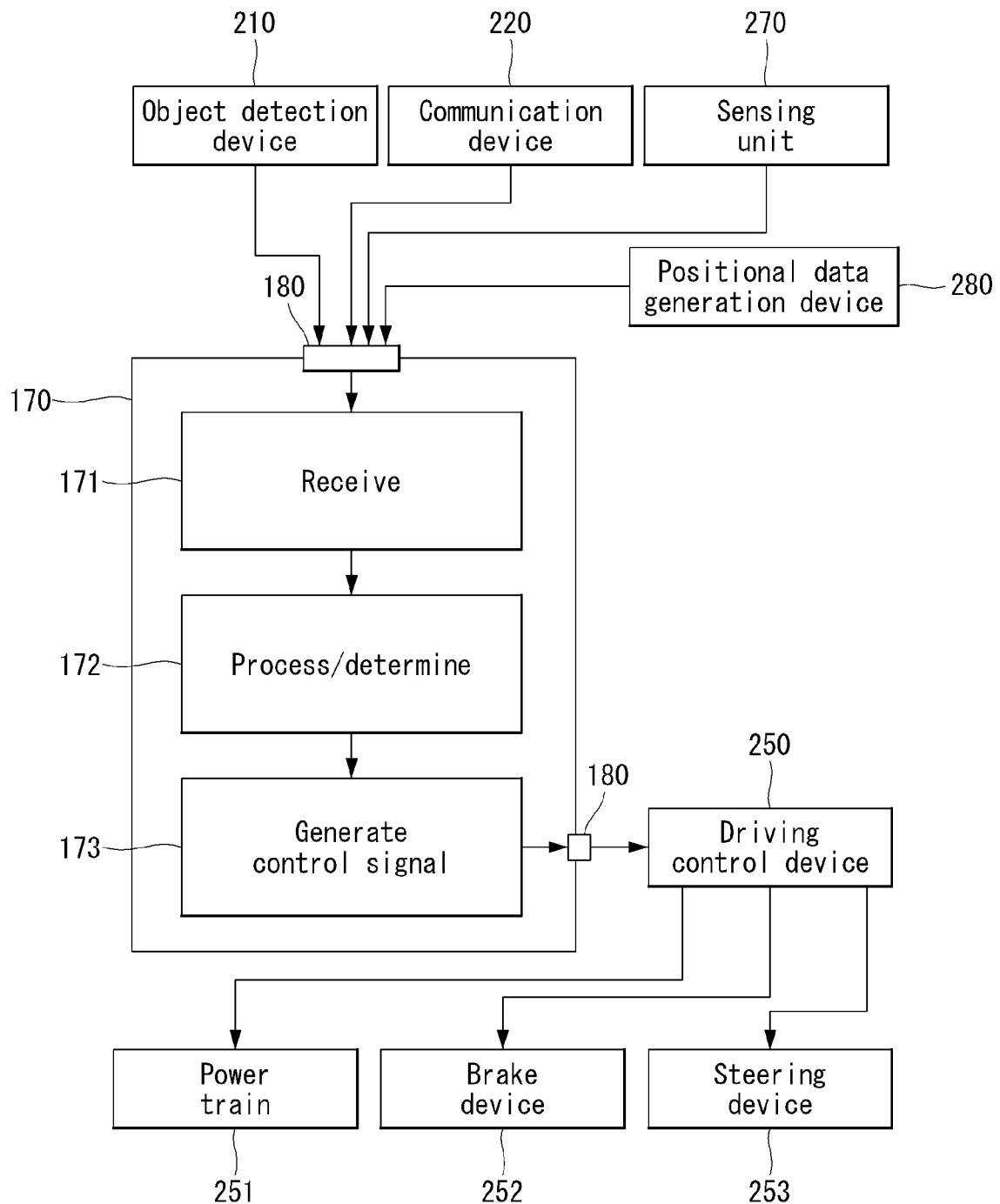

[FIG. 7]
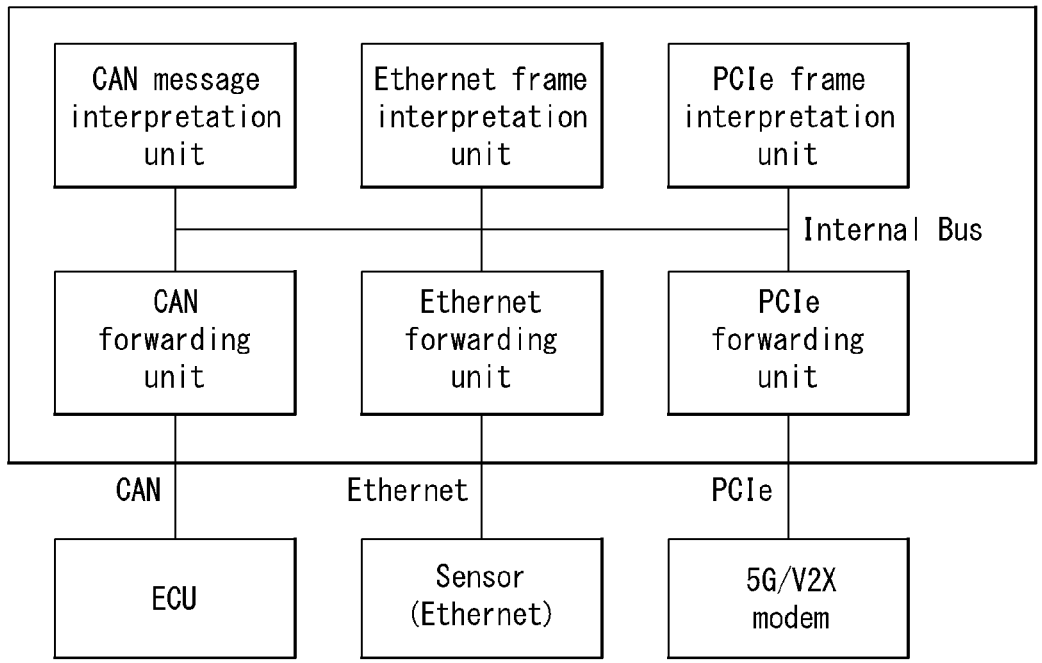
[FIG. 8]
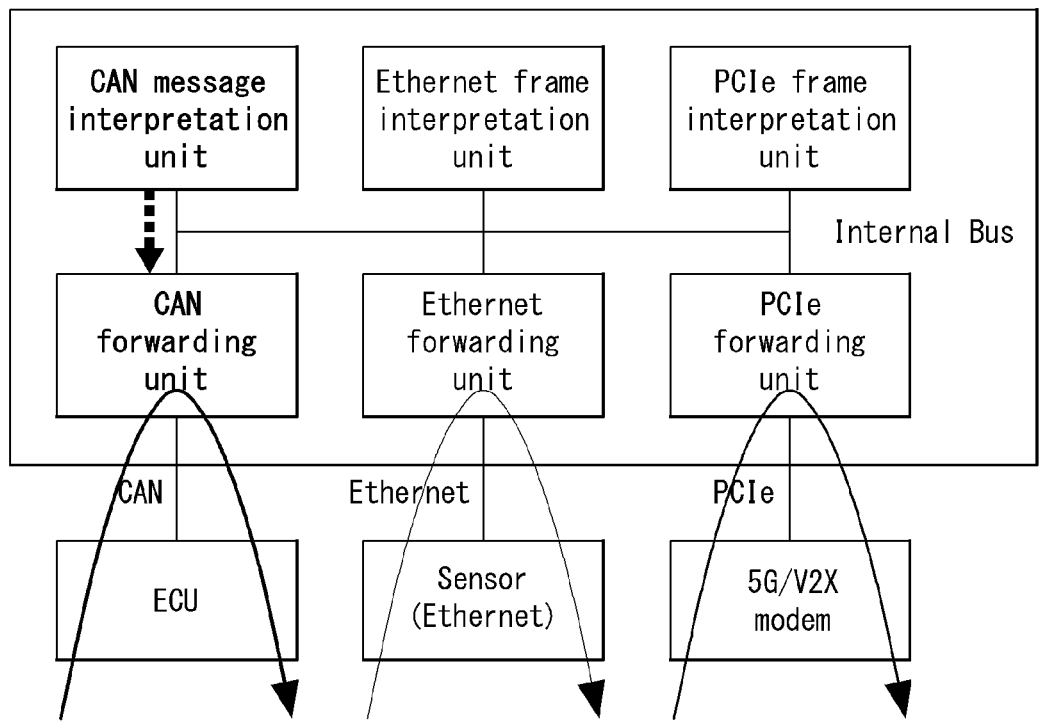

[FIG. 9]
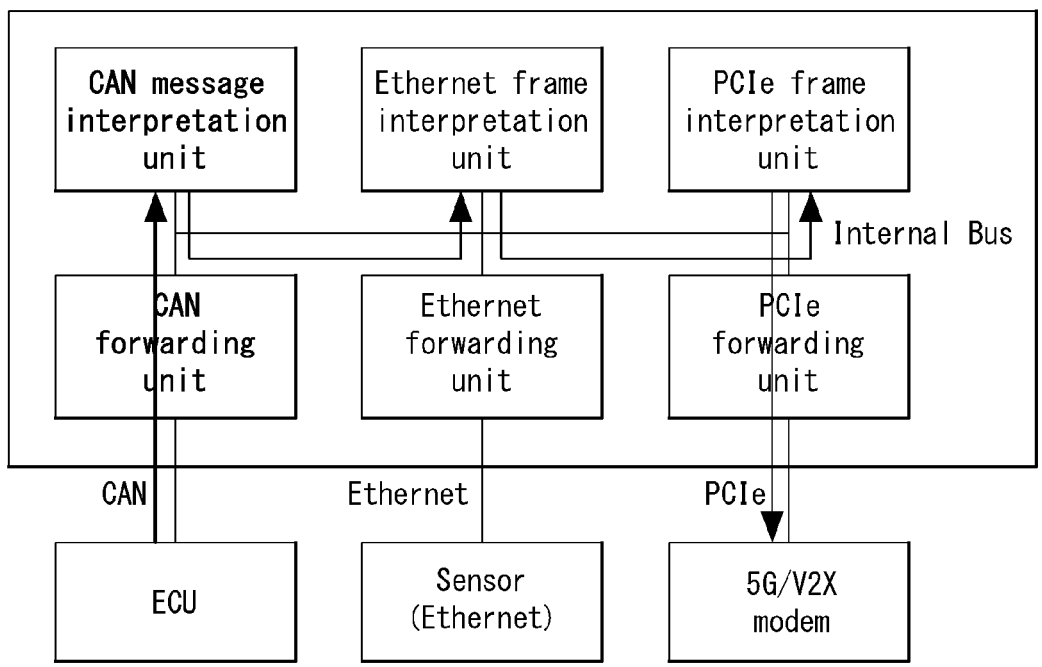

[FIG. 10]
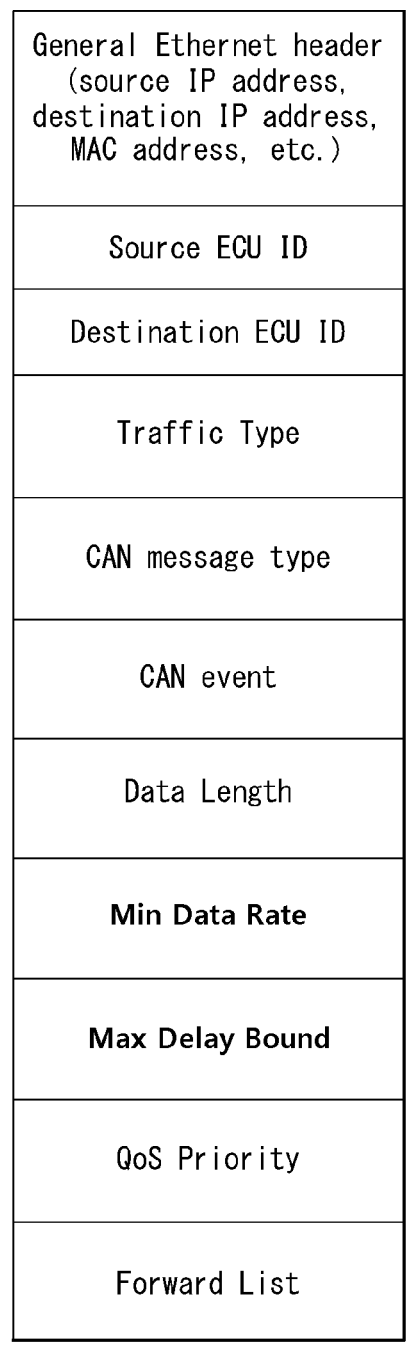

[FIG. 11]
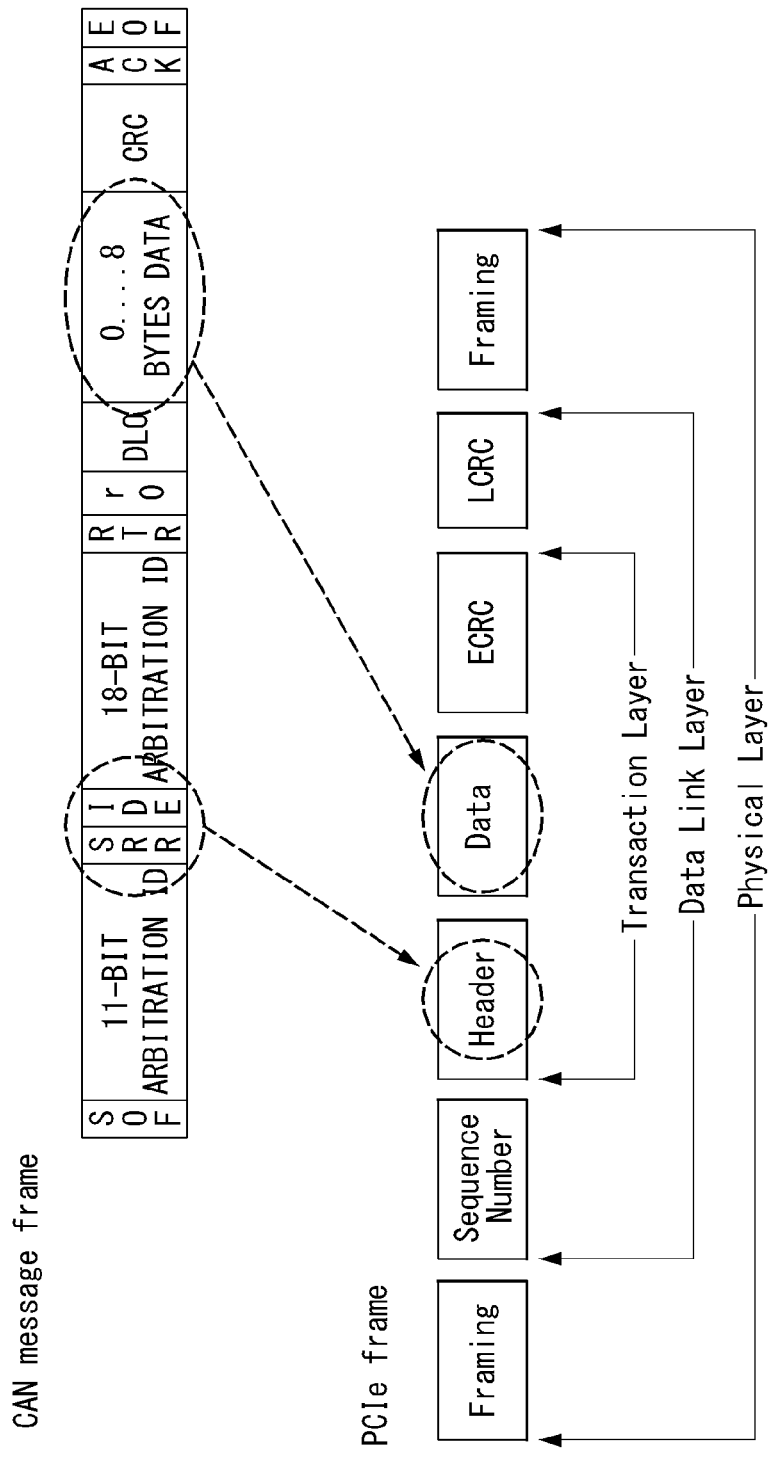

[FIG. 12]
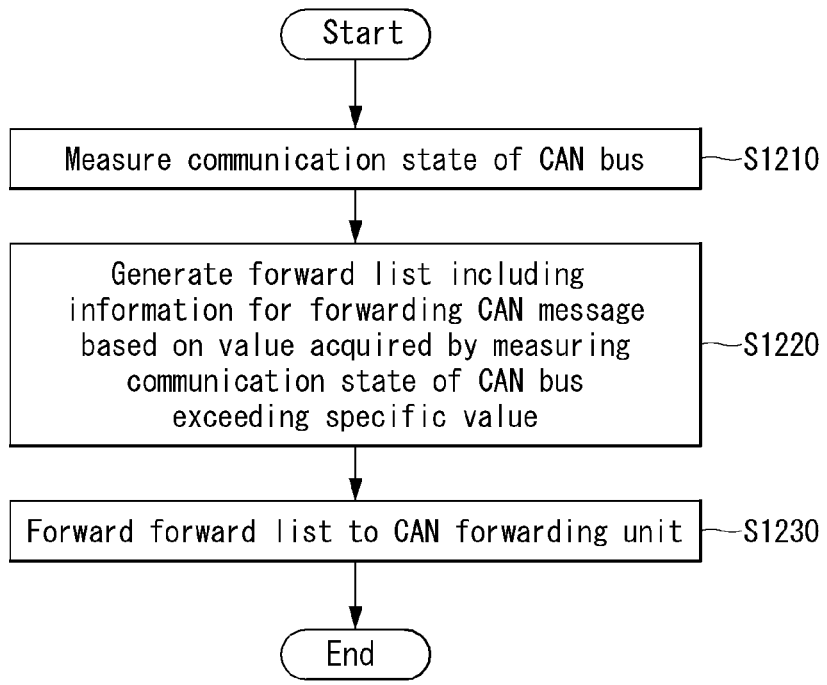
[FIG. 13]
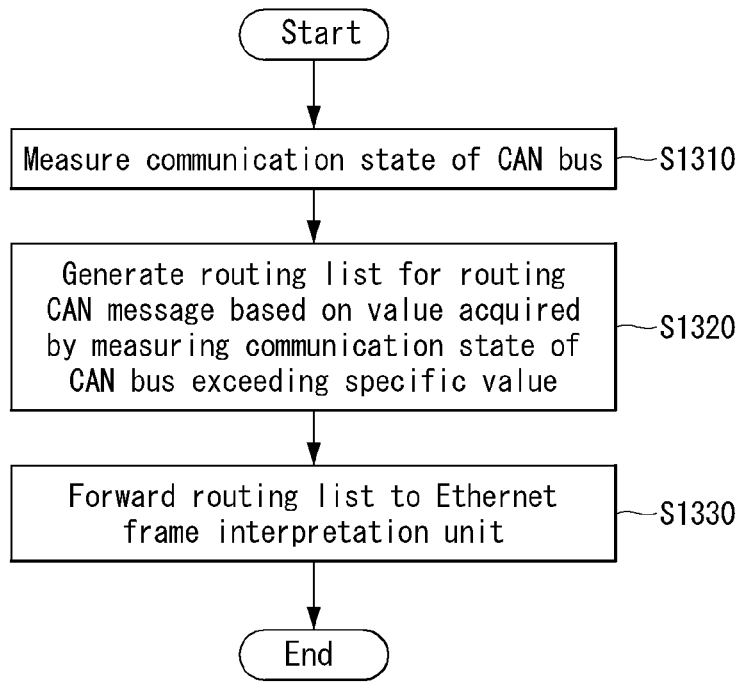

METHOD FOR TRANSMITTING MESSAGE AT HIGH RATE BY VEHICLE

CROSS-REFERENCE TO RELATED APPLICATION

This application is the National Stage filing under 35 U.S.C. 371 of International Application No. PCT/KR2020/014003 filed on Oct. 14, 2020, the contents of which are all hereby incorporated by reference herein in their entirety.

TECHNICAL FIELD

The present disclosure relates to a method for transmitting a message at a high rate through a CAN gateway of a vehicle.

BACKGROUND

Vehicles may be classified into internal combustion engine vehicles, external combustion engine vehicles, gas turbine vehicles, electric vehicles, and the like, depending on the type of used motor.

An autonomous vehicle refers to a vehicle that can operate by itself without driver or passenger manipulation, and an autonomous driving system refers to a system that monitors and controls such an autonomous vehicle so that the autonomous vehicle can operate by itself.

SUMMARY

An object of the present disclosure is to propose a method for simultaneously transmitting and receiving data in real time through a Transmission Control Unit (TCU) by a vehicle.

Further, an object of present disclosure includes a method for transmitting data at a high rate by solving a bottleneck phenomenon in an application core inside the TCU by the vehicle.

The technical objects of the present disclosure are not limited to the aforementioned technical objects, and other technical objects, which are not mentioned above, will be apparent and appreciated by a person having ordinary skill in the art from the following description.

In an aspect of the present disclosure, a method for transmitting a controller area network (CAN) message by a first analysis module included in a controller of a vehicle may include: measuring a communication state of a CAN bus of the vehicle; based on a measured value of the communication state of the CAN bus exceeding a first predetermined value, generating a forward list including information for forwarding the CAN message; and forwarding the forward list to a first forwarding module, and the first forwarding module may be configured to forward the CAN message based on the forward list.

In addition, the forward list may include 1) an identifier of a CAN message to be forwarded and 2) an identifier indicating a target of forwarding.

In addition, the first analysis module and the first forwarding module may be related to the CAN message.

In addition, the method may further include generating a routing list for routing the CAN message based on the value acquired by measuring the communication state of the CAN bus exceeding a second set value.

In addition, the routing list may include 1) interface type information of a routing receiver and 2) Internet protocol (IP) address information related to a destination of routing.

In addition, the method may further include forwarding the routing list to a second analysis module, wherein the second analysis module may be related to Ethernet.

In addition, the IP address information may indicate 1) IP address information related to an internal network of the vehicle or 2) IP address information related to an external network of the vehicle.

In addition, the second analysis module may be configured to route the CAN message based on the IP address information indicating the IP address information related to the external network of the vehicle.

In addition, a data type of the CAN message may indicate sensing data of the vehicle.

In addition, based on the interface type information of the routing receiver, the second analysis module may be configured to convert a frame of the CAN message.

In another aspect of the present disclosure, a controller of a vehicle for transmitting a controller area network (CAN) message may include: a first analysis module measuring a communication state of a CAN bus of the vehicle, generating a forward list including information for forwarding the CAN message based on the value acquired by measuring the communication state of the CAN bus exceeding a first set value, and forwarding the forward list to a first forwarding module; and a first forwarding module configured to forward the CAN message based on the forward list.

Advantageous Effects

According to an embodiment of the present disclosure, the vehicle can simultaneously transmit and receive data through the TCU.

Further, according to an embodiment of the present disclosure, the vehicle is capable of transmitting data at a high rate by solving a bottleneck phenomenon in an application core inside a TCU.

The present disclosure is not limited to the aforementioned effects, and other technical effects not described above may be evident and understood by a person having ordinary skill in the art to which the present disclosure pertains from the following description.

DESCRIPTION OF DRAWINGS

FIG. 1 is a block diagram of a wireless communication system to which the methods proposed herein may be applied.

FIG. 2 shows an example of a signal transmitting/receiving method in a wireless communication system.

FIG. 3 is a diagram illustrating a vehicle according to an embodiment of the present disclosure.

FIG. 4 is a control block diagram of a vehicle according to an embodiment of the present disclosure.

FIG. 5 is a control block diagram of an autonomous vehicle according to an embodiment of the present disclosure.

FIG. 6 is a signal flowchart of an autonomous vehicle according to an embodiment of the present disclosure.

FIG. 7 illustrates a TCU to which the embodiments of the present disclosure may be applied.

FIG. 8 illustrates message forwarding to which the embodiments of the present disclosure may be applied.

FIG. 9 illustrates message routing to which the embodiments of the present disclosure may be applied.

FIG. 10 illustrates an Ethernet frame to which the embodiments of the present disclosure may be applied.

FIG. 11 illustrates PCIe frame conversion to which the embodiments of the present disclosure may be applied.

FIG. 12 illustrates a forwarding operation to which the embodiments of the present disclosure may be applied.

FIG. 13 illustrates a routing operation to which the embodiments of the present disclosure may be applied.

Accompanying drawings included as a part of the detailed description for helping understand the present disclosure provide embodiments of the present disclosure and are provided to describe technical features of the present disclosure with the detailed description.

DETAILED DESCRIPTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 may perform detailed autonomous operations.

A 5G network including another vehicle communicating with the autonomous device is defined as a second communication device (920 of FIG. 1), and a processor 921 may perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass, and a head mounted display (HMD)), etc. For example, the HMD may be a display device worn on the head of a user. For example, the HMD may be used to realize virtual reality (VR), augmented reality (AR), or mixed reality (MR).

Referring to FIG. 1, the first communication device 910 and the second communication device 920 respectively include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915/925 transmits a signal through each corresponding antenna 916/926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in downlink (DL) (communication from the first communication device to the second communication device). The Rx processor implements various signal processing functions of L1 (i.e., physical layer).

Uplink (UL) (communication from the second communication device to the first communication device) is processed in the first communication device 910 in a way similar to that described in association with a receiver function in the second communication device 920. Each Tx/Rx module 915/925 receives a signal through each corresponding antenna 916/926. Each Tx/Rx module provides RF carriers and information to the Rx processor 913/923. The processor 921 may be related to the memory 924 that stores program code and data. The memory may be referred to as a computer-readable medium.

B Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE may receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE may acquire broadcast information in the cell by receiving a physical broadcast channel (PBCH) from the BS. Further, the UE may receive a downlink reference signal (DL RS) in the initial cell search step to check a downlink channel state. After initial cell search, the UE may acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE may perform a random access procedure (RACH) for the BS (steps S203 to S206). To this end, the UE may transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE may perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network may configure the UE such that the UE has a plurality of CORESETs.

The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH may be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE may perform cell search, system information acquisition, beam alignment for initial access, and DL measurement on the basis of a Synchronization Signal Block (SSB). The SSB is interchangeably used with a synchronization signal/physical broadcast channel (SS/PBCH) block.

The SSB includes a Primary Synchronization Signal (PSS), a Secondary Synchronization Signal (SSS) and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity may be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure may be used for network initial access, handover, and UE-triggered UL data transmission. A UE may acquire UL synchronization and UL transmission resources through the random access procedure. The random access procedure is classified into a contention-based random access procedure and a contention-free random access procedure. A detailed procedure for the contention-based random access procedure is as follows.

A UE may transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE may receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE may be determined according to presence or absence of a random access preamble ID with respect to the preamble transmitted by the UE. If there is no response to Msg1, the UE may retransmit the RACH preamble less than a predetermined number of times while performing power ramping. The UE calculates PRACH transmission power for preamble retransmission on the basis of most recent pathloss and a power ramping counter.

The UE may perform UL transmission through Msg3 of the random access procedure over a physical uplink shared channel on the basis of the random access response information. Msg3 may include an RRC connection request and a UE ID. The network may transmit Msg4 as a response to Msg3, and Msg4 may be handled as a contention resolution message on DL. The UE may enter an RRC connected state by receiving Msg4.

C. Beam Management (BM) Procedure of 5G Communication System

A BM procedure may be divided into (1) a DL BM procedure using an SSB or a CSI-RS and (2) a UL BM procedure using a sounding reference signal (SRS). In addition, each BM procedure may include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set may be set as {SSBx1, SSBx2, SSBx3, SSBx4, . . . }. An SSB index may be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.
- When a CSI-RS resource is configured in the same OFDM symbols as an SSB and 'QCL-TypeD' is applicable, the UE may assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam may be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof
- The UE skips a CSI report. That is, the UE may skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and may be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR may refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services may be scheduled on non-overlapping time/frequency resources, and URLLC transmission may occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE may assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information may be transmitted/received through a narrowband (e.g., 6 resource blocks (RBs) or 1 RB).

Driving
(1) Exterior of Vehicle
FIG. 3 is a diagram showing a vehicle according to an embodiment of the present disclosure.

Referring to FIG. 3, a vehicle 10 according to an embodiment of the present disclosure is defined as a transportation means traveling on roads or railroads. The vehicle 10 includes a car, a train, a motorcycle, or the like. The vehicle 10 may include an internal-combustion engine vehicle having an engine as a power source, a hybrid vehicle having an engine and a motor as a power source, or an electric vehicle having an electric motor as a power source. The vehicle 10 may be a privately owned vehicle. The vehicle 10 may be a shared vehicle. The vehicle 10 may be an autonomous vehicle.

(2) Components of Vehicle
FIG. 4 is a control block diagram of the vehicle according to an embodiment of the present disclosure.

Referring to FIG. 4, the vehicle 10 may include a user interface device 200, an object detection device 210, a communication device 220, a driving manipulation device 230—also referred to as a driving operation device, a main electronic control unit (ECU) 240, a vehicle driving device 250—also referred to as a driving control device, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals between one another.

1) User Interface Device
The user interface device 200 is a device for communication between the vehicle 10 and a user. The user interface device 200 may receive user input and provide information generated in the vehicle 10 to the user. The vehicle 10 may realize a user interface (UI) or user experience (UX) through the user interface device 200. The user interface device 200 may include an input device, an output device, and a user monitoring device.

2) Object Detection Device
The object detection device 210 may generate information about objects outside the vehicle 10. Information about an object may include at least one of information on presence or absence of an object, positional information of an object, information on a distance between the vehicle 10 and an object, or information on a relative speed of the vehicle 10 with respect to an object. The object detection device 210 may detect objects outside the vehicle 10. The object detection device 210 may include at least one sensor which may detect objects outside the vehicle 10. The object detection device 210 may include at least one of a camera, a radar, a lidar, an ultrasonic sensor, an infrared sensor, or the like. The object detection device 210 may provide data about an object generated on the basis of a sensing signal generated from a sensor to at least one electronic device included in the vehicle.

2.1) Camera
The camera may generate information about objects outside the vehicle 10 using images. The camera may include at least one lens, at least one image sensor, and at least one processor which is electrically connected to the image sensor, processes received signals, and generates data about objects on the basis of the processed signals.

The camera may be at least one of a mono camera, a stereo camera, or an around view monitoring (AVM) camera. The camera may acquire positional information of objects, information on distances to objects, or information on relative speeds with respect to objects using various image processing algorithms. For example, the camera may acquire information on a distance to an object and information on a relative speed with respect to the object from an obtained image on the basis of changes in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image obtained from a stereo camera on the basis of disparity information.

The camera may be attached at a portion of the vehicle at which FOV (field of view) may be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk, or a tail gate. The camera may be disposed in proximity to at least one of side windows inside the vehicle in order to acquire side view images of the vehicle. Alternatively, the camera may be disposed near a side mirror, a fender, or a door.

2.2) Radar

The radar may generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar may detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind, or on the side of the vehicle.

2.3) Lidar

The lidar may generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar may detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 may exchange signals with devices disposed outside the vehicle 10. The communication device 220 may exchange signals with at least one of infrastructure (e.g., a server and a broadcast station), another vehicle, or a terminal. The communication device 220 may include a transmission antenna, a reception antenna, and at least one of a radio frequency (RF) circuit and an RF element which may implement various communication protocols in order to perform communication.

For example, the communication device may exchange signals with external devices on the basis of C-V2X (Cellular V2X). For example, C-V2X may include sidelink communication on the basis of LTE and/or sidelink communication on the basis of NR. Details related to C-V2X will be described later.

For example, the communication device may exchange signals with external devices on the basis of DSRC (Dedicated Short Range Communications) or WAVE (Wireless Access in Vehicular Environment) standards on the basis of IEEE 802.11p PHY/MAC layer technology and IEEE 1609 Network/Transport layer technology. DSRC (or WAVE standards) are communication specifications for providing an intelligent transport system (ITS) service through short-range dedicated communication between vehicle-mounted devices or between a roadside device and a vehicle-mounted device. DSRC may be a communication scheme that may use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure may exchange signals with external devices using only one of C-V2X and DSRC. Alternatively, the communication device of the present disclosure may exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal), and a brake input device (e.g., a brake pedal).

5) Main ECU

The main ECU 240 may control the overall operation of at least one electronic device included in the vehicle 10.

6) Driving Control Device

The vehicle driving device control device 250, also referred to as a vehicle driving device, is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 may control vehicle driving devices on the basis of signals received by the autonomous device 260. For example, the driving control device 250 may control a power train, a steering device, and a brake device on the basis of signals received by the autonomous device 260.

7) Autonomous Device

The autonomous device 260 may generate a route for self-driving on the basis of obtained data. The autonomous device 260 may generate a driving plan for traveling along the generated route. The autonomous device 260 may generate a signal for controlling movement of the vehicle according to the driving plan. The autonomous device 260 may provide the signal to the driving control device 250.

The autonomous device 260 may implement at least one ADAS (Advanced Driver Assistance System) function. The ADAS may implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 may perform switching from a self-driving mode to a manual driving mode or switching from the manual driving mode to the self-driving mode. For example, the autonomous device 260 may switch the mode of the vehicle 10 from the self-driving mode to the manual driving mode or from the manual driving mode to the self-driving mode on the basis of a signal received from the user interface device 200.

8) Sensing Unit

The sensing unit 270 may detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, a pedal position sensor, and the like. Further, the IMU sensor may include one or more of an acceleration sensor, a gyro sensor, and a magnetic sensor.

The sensing unit 270 may generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 may generate position data of the vehicle 10. The position data generation device 280 may include at least one of a global positioning system (GPS) and a differential global positioning system (DGPS). The position data generation device 280 may generate position data of the vehicle 10 on the basis of a signal generated from at least one of the GPS and the DGPS. According to an embodiment, the position data generation device 280 may correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 may exchange signals through the internal communication system 50. The signals may include data. The internal communication system 50 may use at least one communication protocol (e.g., CAN, LIN, FlexRay, MOST or Ethernet).

(3) Components of Autonomous Device

FIG. 5 is a block diagram of the autonomous device according to an embodiment of the present disclosure.

Referring to FIG. 5, the autonomous device 260 may include a memory 140, a processor 170, an interface 180, and a power supply unit 190.

The memory 140 is electrically connected to the processor 170. The memory 140 may store data with respect to units, control data for operation control of units, and input/output data. The memory 140 may store data processed in the processor 170. Hardware-wise, the memory 140 may be configured as at least one of a ROM, a RAM, an EPROM, a flash drive, a hard drive, or the like. The memory 140 may store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 may exchange signals with at least one electronic device included in the vehicle 10 in a wired or wireless manner. The interface 180 may exchange signals with at least one of the object detection device 210, the communication device 220, the driving operation device 230, the main ECU 240, the driving control device 250, the sensing unit 270 and the position data generation device 280 in a wired or wireless manner. The interface 180 may be configured using at least one of a communication module, a terminal, a pin, a cable, a port, a circuit, an element, or a device.

The power supply 190 may provide power to the autonomous device 260. The power supply 190 may be provided with power from a power source (e.g., a battery) included in the vehicle 10 and supply the power to each unit of the autonomous device 260. The power supply 190 may operate according to a control signal supplied from the main ECU 240. The power supply 190 may include a switched-mode power supply (SMPS).

The processor 170 may be electrically connected to the memory 140, the interface 180 and the power supply 190 and exchange signals with these components. The processor 170 may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 may be operated by power supplied from the power supply 190. The processor 170 may receive data, process the data, generate a signal, and provide the signal while power is supplied thereto.

The processor 170 may receive information from other electronic devices included in the vehicle 10 through the interface 180. The processor 170 may provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

FIG. 6 is a diagram showing a signal flow in an autonomous vehicle according to an embodiment of the present disclosure.

1) Reception Operation

Referring to FIG. 6, the processor 170 may perform a reception operation. The processor 170 may receive data from at least one of the object detection device 210, the communication device 220, the sensing unit 270, or the position data generation device 280 through the interface 180. The processor 170 may receive object data from the object detection device 210. The processor 170 may receive HD map data from the communication device 220. The processor 170 may receive vehicle state data from the sensing unit 270. The processor 170 may receive position data from the position data generation device 280.

2) Processing/Determination Operation

The processor 170 may perform a processing/determination operation. The processor 170 may perform the processing/determination operation on the basis of traveling situation information. The processor 170 may perform the processing/determination operation on the basis of at least one of object data, HD map data, vehicle state data and position data.

2.1) Driving Plan Data Generation Operation

The processor 170 may generate driving plan data. For example, the processor 170 may generate electronic horizon data. The electronic horizon data may be understood as driving plan data for the vehicle starting from a position at which the vehicle 10 is located to a horizon. The horizon may be understood as a point a predetermined distance away from the position at which the vehicle 10 is located based on a predetermined traveling route. The horizon may refer to a point at which the vehicle may arrive after a predetermined time from the position at which the vehicle 10 is located along a predetermined traveling route.

The electronic horizon data may include horizon map data and horizon path data.

2.1.1) Horizon Map Data

The horizon map data may include at least one of topology data, road data, HD map data, and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be on the basis of data stored in at least one memory included in the vehicle 10.

The road data may include at least one of road slope data, road curvature data and road speed limit data. The road data may further include no-passing zone data. The road data may be on the basis of data received from an external server through the communication device 220. The road data may be on the basis of data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be on the basis of data received from an external server through the communication device 220.

The dynamic data may include various types of dynamic information which may be generated on roads. For example, the dynamic data may include construction information, variable speed road information, road condition information, traffic information, moving object information, etc. The dynamic data may be on the basis of data received from an external server through the communication device 220. The dynamic data may be on the basis of data generated in the object detection device 210.

The processor 170 may provide map data in a range from a position at which the vehicle 10 is located to the horizon.

2.1.2) Horizon Path Data

The horizon path data may be explained as a trajectory through which the vehicle 10 may travel from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road may be calculated to be higher than a probability of selecting the second road.

The horizon path data may include a main path and a sub-path. The main path may be understood as a trajectory obtained by connecting roads having a high relative probability of being selected. The sub-path may be branched from at least one decision point on the main path. The sub-path may be understood as a trajectory obtained by connecting at least one road having a low relative probability of being selected at at least one decision point on the main path.

3) Control Signal Generation Operation

The processor 170 may perform a control signal generation operation. The processor 170 may generate a control signal on the basis of the electronic horizon data. For example, the processor 170 may generate at least one of a power train control signal, a brake device control signal, or a steering device control signal on the basis of the electronic horizon data.

The processor 170 may transmit the generated control signal to the driving control device 250 through the interface 180. The driving control device 250 may transmit the control signal to at least one of a power train 251, a brake device 252, or a steering device 254.

The 5G Transmission Control Unit (TCU) of the vehicle must be connected to controller area network (CAN), Ethernet, 5G modem, etc. to transmit and receive a large amount of data at the same time. The CAN gateway function of a general TCU operates in such a scheme that the CAN/Ethernet/PCIe controller interprets all messages and then forwards them back to the internal CAN/Ethernet/PCIe network, making it difficult to forward messages at high speed. The TCU of the vehicle may be included in an autonomous driving device 260.

In the present disclosure, the vehicle may dynamically distribute jobs that are excessively generated by specific events to an AP dedicated CAN message processing core and a general core when transmitting and receiving data through an external network device or an in-vehicle network device in an Application Processor (AP) inside the TCU.

In addition, if excessive traffic occurs in a CAN bus of a CAN controller located inside/outside the TCU, and the CAN message processing core of the AP exceeds the capacity to process the CAN message flowing through the CAN controller, in order to lower a load, a resource redistribution operation of determining an excessive load and lowering the core of the AP may be performed by using an AP CAN message processing core load value, a CAN bus load value, a latency, and a throughput.

For example, in order to transmit and receive sensor data inside the vehicle and an HD-MAP downloaded from the 5G MEC server, the vehicle may distribute the jobs of the core that interprets the CAN/Ethernet/PCIe message to a core of a forwarding unit, determine an available resource for each core, and configure a data path for forwarding the received data, and redistribute resources and jobs of respective core.

FIG. 7 illustrates a TCU to which the present disclosure may be applied.

The conventional TCU interprets the message after sensor data and CAN control commands flow into the CAN controller, and decides whether to convert the frame of the CAN message into an Ethernet/PCIe format or forward the CAN message back to the CAN internal network, so it is difficult to process the CAN message at a high rate.

For example, in the In-Vehicle Network, a raw data rate generated by one vehicle sensor is 10 Gbps or more, and four front cameras, four rear cameras, two cabin cameras, one front Lidar, one rear Lidar, and one front Radar may be connected directly to the Ethernet or CAN of the TCU.

Therefore, the vehicle has a lot of high-capacity data that needs to be transmitted and received in real time, but the structure of the current TCU is based on the premise that the AP inspects all sensor data.

For example, even when the sensor data is generated in the internal ECU and transmitted to the internal ECU, the current TCU may repeat an operation of interpreting the corresponding CAN message and generating a CAN message to be forwarded to a target ECU again, resulting in consumption of a lot of resources of the AP.

Referring to FIG. 7, the present disclosure illustrates the TCU according to an embodiment of the present disclosure for solving the above problems. In the embodiment, the TCU may be separated into a forwarding unit (forward function unit) for forwarding the CAN message and a CAN message interpretation unit for interpreting and converting the CAN message into other interface frames.

Through this, the CAN forwarding unit may forward the CAN message to the internal ECU.

In addition, the CAN message interpretation unit may interpret the CAN message, convert the CAN message into a frame for a specific interface, and decide whether to transmit the frame.

Table 1 below shows an example of a forward list generated by the CAN message interpretation unit.

TABLE 1

Struct forward_list{uint can_id; //his'her own CAN_ID uint target_can_id;//target CAN_ID uint transmit_time; uint frequent; uint can_bus_load; uint core_utilization; uint max_delay;}forward_list;

Referring to Table 1, in the embodiment of the present disclosure, the vehicle Ethernet frame may include the forward list. Here, the forward list may be used when the CAN message interpretation unit forwards the job to the CAN forwarding unit. In more detail, the CAN interpretation unit may check the communication state of the CAN BUS. For example, when a CAN bus load, a CAN data rate, a CAN delay rate, etc. exceed a specific value, the CAN interpretation unit may forward the forward list to the CAN forwarding unit.

The CAN forwarding unit may forward the CAN message to the ECU based on the forward list. For example, the CAN forwarding unit may analyze the received CAN message, compare an identifier of the received CAN message with an identifier of a forward list, and directly forward the CAN message to a target ECU without forwarding the CAN message to the CAN interpretation unit.

For example, if the ECU transmits the CAN message to the TCU as a target and the driver or vehicle issues an ECU control command (e.g., Brake: 60%, RPM: 30%, etc.), the CAN forwarding unit may directly forward the CAN message to the ECU as the target based on the forward list.

FIG. 8 illustrates an example of message forwarding to which the present disclosure may be applied.

Referring to FIG. 8, as described above, the CAN forwarding unit may forward the received CAN message to the ECU based on the forward list. Of course, the operation may be similarly performed in the Ethernet forwarding unit or the PCIe forwarding unit.

FIG. 9 illustrates an example of message routing to which the present disclosure may be applied.

Referring to FIG. 9, the TCU may route a message based on a routing list.

Table 2 below shows an example of the routing list generated by the CAN message interpretation unit.

TABLE 2

Struct routing_list{uint source_ip_address; uint source_pcie_address; uint can_source_id; uint target_interface_type; //receiver interface type uint destination_ip_address; uint destination_pcie_address; uint transmit_time; uint min_data_rate; //throughput uint max_delay; uint frequent; uint can_bus_load; uint core_utilization;}routing_list;

Referring back to FIG. 9, the CAN message interpretation unit receiving the CAN message from the ECU may check the communication state of the CAN BUS. For example, if the CAN Bus Load, the CAN Data Rate, the CAN Delay Rate, etc. exceed a specific value, the routing list may be generated and forwarded to the Ethernet frame interpretation unit. When the target_interface_type is PCIe, the Ethernet frame interpretation unit examines the destination_ip_address, determines whether the corresponding ip address is a private ip or a public ip, and forwards the CAN message to the PCIe frame interpretation unit when the ip address is the public ip.

The PCIe frame interpretation unit may convert the CAN message into the PCIe frame and forward the PCIe frame to a destination ip address through the PCIe forwarding unit.

Frame Conversion

1. Converting CAN Message into Ethernet Frame

The CAN message interpretation unit may determine whether the CAN message is a Control message or a Data message by checking the CAN message type in the received CAN message.

For example, a control message forwarded from a specific ECU (e.g., a brake ECU) to an ECU (e.g., an RPM ECU) existing inside the vehicle may be forwarded to the target ECU by the CAN forwarding unit.

If the CAN message is the Data message, the CAN message interpretation unit checks a value, for example can source id, to determine whether the CAN message is a CAN message used inside the vehicle.

Table 3 below shows an example of the Data message.

TABLE 3

| CAN source ID | Message contents | Final destination | Target interface |
|---|---|---|---|
| 0x0001 | Camera sensor data | Internal AVN | Ethernet |
| 0x0002 | Lidar sensor data | 5G MEC server | PCIe |
| 0x0003 | Radar sensor data | 5G MEC server | PCIe |

Referring to Table 3, the CAN message interpretation unit may determine based on the table whether the CAN message is a control message to be forwarded to an internal ECU, or a data message to be exported to the external network.

FIG. 10 illustrates an example of an Ethernet frame to which the present disclosure may be applied.

Referring to FIG. 10, the Ethernet frame interpretation unit may generate an Ethernet frame including main data of the CAN message and having the following fields.

1) Source ECU ID: ID of the ECU which transmits an ECU control command, sensor data, etc. (e.g., ID of a front camera sensor ECU)
2) Destination ECU ID: ID of the ECU which receives the ECU control command, the sensor data, etc. (e.g., ID of a brake ECU)
3) Traffic Type: Type of traffic indicating the ECU control command, the HD-MAP, an OTA firmware file, multimedia data, etc.
4) CAN message type: CAN message for control and CAN message for data
5) CAN event: Reason why the target CAN ID is generated (event), for example, the ignition of the vehicle is ON, and the brake control value is changed to 30%
6) Data Length
7) Min Data Rate: Minimum value of data rate
8) Max Delay Bound: Maximum value of delay
9) Forward List 2. Converting CAN Message into PCIe Frame FIG. 11 illustrates an example of a PCIe frame conversion to which the present disclosure may be applied.

Referring to FIG. 11, the PCIe frame interpretation unit copies the contents of the body excluding the header part of the CAN message to the data part of the PCIe frame and checks the sender CAN_ID and the receiver CAN_ID to generate a sender address and a transmitter address in the PCIe header.

FIG. 12 illustrates an example of a forwarding operation to which the present disclosure may be applied.

Referring to FIG. 12, a controller (e.g., TCU) of the vehicle may include and/or implement a CAN message interpretation unit for interpreting the CAN message, a CAN forwarding unit for transmitting the CAN message, an Ethernet frame interpretation unit for interpreting the Ethernet frame, an Ethernet forwarding unit for forwarding the Ethernet frame, a PCIe frame interpretation unit for interpreting the PCIe frame, and a PCIe forwarding unit for forwarding the PCIe frame, and respective units may transmit and receive signals through an internal BUS.

Referring to the example of FIG. 12, the CAN message interpretation unit measures the communication state of the CAN bus (S1210). For example, the CAN message interpretation unit may receive a load value of the CAN bus through a Domain control unit (DCU).

The CAN message interpretation unit generates a forward list including information for forwarding the CAN message based on a value acquired by measuring the communication state of the CAN bus exceeding a specific value (S1220). For example, the value acquired by measuring the communication state of the CAN bus may include CAN Bus Load, CAN Data Rate, and CAN delay Rate values.

The CAN message interpretation unit forwards the forward list to the CAN forwarding unit (S1230). For example, the forward list may include 1) an identifier (can_id) of a CAN message to be forwarded, and 2) an identifier (target_can_id) indicating the target of forwarding. Through this, the CAN forwarding unit may be configured to forward the CAN message based on the forward list.

FIG. 13 illustrates an example of a routing operation to which the present disclosure may be applied.

The operation of FIG. 13 may be performed separately from or combined with the aforementioned forwarding operation of FIG. 12.

In the example, the CAN message interpretation unit measures the communication state of the CAN bus (S1310). For example, the CAN message interpretation unit may receive a load value of the CAN bus through a Domain control unit (DCU).

The CAN message interpretation unit generates a routing list for routing the CAN message based on the value acquired by measuring the communication state of the CAN bus exceeding the specific value (S1320). The specific value for routing may be the same as or different from the aforementioned specific value for forwarding.

The CAN message interpretation unit forwards the routing list to the Ethernet frame interpretation unit (S1330).

For example, the routing list may include 1) interface type information (target_interface_type) of a routing receiver and 2) Internet protocol (IP) address information (destination_ip_address) related to a destination of routing.

In addition, the Internet protocol (IP) address information related to the destination of the routing may indicate 1) IP address information (private IP) related to the internal network of the vehicle or 2) IP address information (public IP) related to the external network of the vehicle. The Ethernet frame interpretation unit may be configured to transmit the CAN message to the external network through the PCIe forwarding unit based on the routing list when the Internet protocol (IP) address information related to the destination of the routing indicates the IP address information (public IP) related to the external network of the vehicle. Further, a routing operation for transmission to the external network may be performed when the type of CAN message is the data type (e.g., sensing data).

In addition, the Ethernet frame interpretation unit may convert the frame of the CAN message based on the interface type information (target_interface_type) of the routing receiver. For example, when the interface type information of the routing receiver indicates the Ethernet, the Ethernet frame interpretation unit may change the CAN message to the Ethernet frame.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, an embodiment of the present disclosure may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, an embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

The foregoing disclosure allows the program to be implemented as a computer-readable code on a medium having a program recorded therein. The computer-readable medium includes all kinds of recording devices storing data which may be read by a computer system. Examples of computer-readable media include Hard Disk Drive (HDD), Solid State Disk (SSD), Silicon Disk Drive (SDD), ROM, RAM, CD-ROM, magnetic tape, floppy disk, optical data storage device, etc., and also includes those implemented in the form of a carrier wave (e.g., transmission over the Internet). Further, the computer may include a processor Y120 of a terminal. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

The invention claimed is:

1. A method for transmitting a controller area network (CAN) message by a CAN message interpretation unit included in a controller of a transmission control unit (TCU) of a vehicle, the method comprising:
  measuring a value of a communication state of a CAN bus of the vehicle by the CAN message interpretation unit;
  generating a forward list including information for forwarding the CAN message by the CAN message interpretation unit based on the measured value exceeding a first predetermined value;
  forwarding the forward list to the CAN forwarding unit by the CAN message interpretation unit,
  forwarding the CAN message based on the forward list to an electronic control unit (ECU) of the vehicle by the CAN forwarding unit;
  generating a routing list for routing the CAN message based on the measured value exceeding a second predetermined value by the CAN message interpretation unit; and
  forwarding the routing list to an Ethernet frame interpretation unit included in the controller by the CAN message interpretation unit,
  wherein the routing list includes: 1) interface type information of a routing receiver; and 2) Internet protocol (IP) address information related to a destination of routing.

2. The method of claim 1, wherein the forward list includes: 1) an identifier of a CAN message to be forwarded; and 2) an identifier indicating a target of forwarding the CAN message.

3. The method of claim 1, wherein the CAN message interpretation unit and the CAN forwarding unit are related to the CAN message.

4. The method of claim 1, wherein the IP address information indicates: 1) IP address information related to an internal network of the vehicle; or 2) IP address information related to an external network.

5. The method of claim 4, wherein the CAN message is routed by the Ethernet frame interpretation unit based on the IP address information indicating IP address information related to the external network.

6. The method of claim 5, wherein a data type of the CAN message indicates sensing data of the vehicle.

7. The method of claim 5, wherein a frame of the CAN message is converted by the Ethernet frame interpretation unit based on the interface type information of the routing receiver.

8. A controller of a transmission control unit (TCU) of a vehicle for transmitting a controller area network (CAN) message, the controller comprising:
  a CAN message interpretation unit configured to measure a value of a communication state of a CAN bus of the vehicle, generate a forward list including information for forwarding the CAN message based on the measured value exceeding a first predetermined value, forward the forward list to a CAN forwarding unit, generate a routing list for routing the CAN message based on the measured value exceeding a second predetermined value, and forwarding the routing list to an Ethernet frame interpretation unit included in the controller by the CAN message interpretation unit;

the CAN forwarding unit configured to forward the CAN message based on the forward list to an electronic control unit (ECU) of the vehicle; and an Ethernet frame interpretation unit configured to receive the routing list forwarded from the CAN message interpretation unit, wherein the routing list includes: 1) interface type information of a routing receiver; and 2) Internet protocol (IP) address information related to a destination of routing.

9. The controller of claim 8, wherein the forward list includes: 1) An identifier of a CAN message to be forwarded; and 2) an identifier indicating a target of forwarding the CAN message.

10. The controller of claim 8, wherein the CAN message interpretation unit and the CAN forwarding unit are related to the CAN message.

11. The controller of claim 8, wherein the IP address information indicates: 1) IP address information related to an internal network of the vehicle; or 2) IP address information related to an external network.

12. The controller of claim 11, wherein the Ethernet frame interpretation unit is further configured to route the CAN message based on the IP address information indicating IP address information related to the external network.

13. The controller of claim 12, wherein a data type of the CAN message indicates sensing data of the vehicle.

14. The controller of claim 12, wherein the Ethernet frame interpretation unit is further configured to convert a frame of the CAN message based on interface type information of the routing receiver.

* * * * *